United States Patent Office 3,576,887
Patented Apr. 27, 1971

3,576,887
PROCESS FOR THE PREPARATION OF OXAPHEN-ANTHRENES AND INTERMEDIATES THEREFOR
Gordon A. Hughes, Haverford, Timothy Y. Jen, Havertown, and Herchel Smith, Wayne, Pa., assignors to American Home Products Corporation, New York, N.Y.
No Drawing. Continuation-in-part of application Ser. No. 602,126, Dec. 16, 1966. This application May 1, 1967, Ser. No. 634,894
Int. Cl. C07c 37/00, 39/02
U.S. Cl. 260—619     5 Claims

ABSTRACT OF THE DISCLOSURE 6,6-dialkyltetra-hydro- and hexahydro - 6H - dibenzo [b,d] pyrans (I) are obtained by cyclodehydrating a 1-(1'-hydroxy)alkyl - 2 - o - hydroxyphenylcyclohexane or -ene (III). Compounds (III) are obtained by treating a 2-o-alkoxy-phenylcyclohexane- or enecarboxylic acid or ester (II) with a Grignard reagent. Enantiomorphic compounds (I), particularly, (−) - $\Delta^8$ - tetrahydrocannabinol, a biologically active, asymmetric constituent of hashish, are prepared by cyclizing the corresponding enantiomorphic compounds (III).

---

This aplication is a continuation-in-part of copending application, Ser. No. 602,126, filed Dec. 16, 1966, now abandoned. This invention relates to the synthesis of oxaphenanthrenes. More particularly, it is concerned with a simple and novel process for the preparation of oxaphenanthrenes related to and including substituted tetrahydrocannabinols, which are widely recognized to be useful as central nervous system depressants in mammals.

The oxaphenanthrenes with which this invention is concerned broadly are compounds of the formula:

I
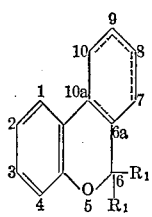

wherein $R_1$ is alkyl of from 1 to 6 carbon atoms; the aromatic 6-membered ring may be additionally substituted with alkyl, substituted alkyl or hydroxy groups; and the cyclohexane ring may be substituted with alkyl groups and may contain one olefinic bond in any of the positions indicated by the broken lines. An accepted numbering system is indicated and will be employed herein and in the appended claims.

It has been known for over 25 years that some of the principal active ingredients of the natural product, hashish, contain the oxaphenanthrene nucleus, but only in the last few years has the structure and stereochemical configuration of two such optically active oxaphenanthrenes, 6a,7,10,10a - tetrahydro - 6,6,9 - trimethyl-3 - n - pentyl - trans - 6H - dibenzo - [b,d]pyran - 1 - ol and its 6a,7,8,10a-tetrahydro isomer, been elucidated [E. C. Taylor, K. Lenard and Y. Shvo, J. Am. Chem. Soc., 88, 367 (1966) and references cited therein and R. Mechoulam and Y. Gaoni, J. Am. Chem. Soc., 87, 3273 (1965)]. These compounds are double bond isomers of 7,8,9,10 - tetrahydro - 6,6,9 - trimethyl-3-n-pentyl-trans-6H-dibenzo-[b,d]pyran-1-ol, a compound which was synthesized in racemic form by early investigators [A. R. Ghosh, A. R. Todd and S. Wilkinson, J. Chem. Soc., 1393 (1940) and R. Adams and B. R. Walker, J. Am. Chem. Soc. 62, 2405 (1940)]. Neither of the known oxaphenanthrene components present in the natural product have been synthesized, although racemates corresponding to the naturally occurring enantiomorphs have been prepared, by methods which have either been non-rational, leading to complex mixtures, from which the required product could only be isolated in low yield (Taylor et al. and Mechoulam et al., loc. cit.), or have been lengthy and have involved the separation of stereoisomers at some stage [K. E. Fahrenholtz, M. Lurie and R. W. Kierstad, J. Am. Chem. Soc., 88, 2079 (1966) and F. Korte, E. Dlugosch and U. Claussen, Annalen, 693, 165 (1966)]. In no case has an optically active, naturally occurring product been obtained.

It is, therefore, a primary object of the instant invention to provide asimplified means to obtain oxaphenanthrenes.

It is a further object of this invention to provide a convenient means to obtain that class of oxaphenanthrenes, also known as tetra- and hexahydrocannabinols, with central nervous depressant properties.

Still another object of the present invention is to provide simplified means to obtain the oxaphenanthrene which is one constituent of hashish without the need to depend on a source of supply in nature.

A further object of the invention is to provide a means to obtain optically active oxaphenanthrenes by a stereoselective process comprising cyclizing a resolved precursor.

Another object of the present invention is to provide as a novel composition of matter a class of 1-(1'-hydroxyalkyl) - 2 - o - hydroxyphenylcyclohexanes and olefinic derivatives thereof, which are useful intermediates in providing the said valuable oxaphenanthrenes.

These and other objects apparent to those skilled in the art are readily obtained by practice of the instant invention which is, in essence:

A process which comprises heating a 2-o-alkoxyphenylcyclohexanecarboxylic acid or ester of Formula II with an alkyl-magnesium halide Grignard reagent $R_1$ MgX to afford a 1-(1'-hydroxyalkyl) - 2 - o - hydroxyphenylcyclohexane of Formula III, and treating the latter under dehydrating conditions to form the oxaphenanthrene of Formula I, according to the following scheme:

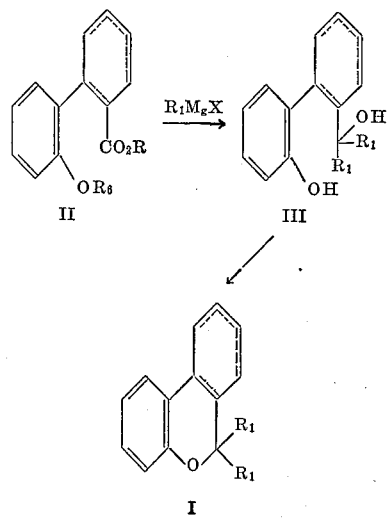

wherein R is hydrogen or alkyl of from 1 to 6 carbon atoms, $R_1$, and $R_6$ are alkyl of from 1 to 6 carbon atoms and the o-alkoxy-phenyl ring in Formula II may be additionally substituted with alkoxy, alkyl and substituted alkyl groups, and the cyclohexane ring in Formula I may be substituted with alkyl groups and contain one olefinic bond in any of the positions indicated by the broken lines. Of course, as will be obvious to those skilled in the art, some Grignard reagents are more effectively used than others to cleave alkoxyl groups ($OR_6$ in Formula II). Thus, in some cases for example, it is more convenient and economical to use a lower alkylmagnesium halide, such as methyl magnesium iodide, to convert $OR_6$ to OH than to use a higher alkyl Grignard reagent, such as hexylmagnesium iodide both to cleave $OR_6$ and to provide $R_1$. Thus "heating ... with an alkylmagnesium halide" broadly contemplates using the same Grignard to cleave $OR_6$ and provide $R_1$ and in addition, a sequential two-step treatment comprising using one Grignard reagent to provide $R_1$ and a second Grignard reagent to cleave $OR_6$ to OH.

Specifically, the invention contemplates a process for the preparation of an oxaphenanthrene of Formula IV.

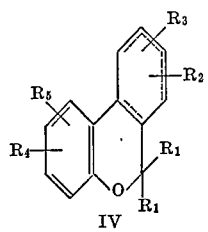

IV or a derivative thereof wherein the cyclohexane ring contains one olefinic bond in any of the positions indicated by the broken lines and wherein, in said oxaphenanthrene or derivative, $R_1$ is alkyl of from 1 to 6 carbon atoms;
$R_2$ and $R_3$ are hydrogen or alkyl of from 1 to 6 carbon atoms;
$R_4$ is hydrogen or alkyl of from 1 to 12 carbon atoms; and
$R_5$ is hydrogen, alkyl of from 1 to 12 carbon atoms or hydroxy;

which comprises treating under dehydrating conditions a 1-(1-hydroxyalkyl) - 2 - o-hydroxyphenylcyclohexane of Formula V:

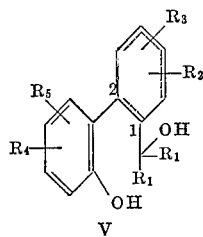

V or a derivative thereof wherein the cyclohexane ring contains one olefinic bond in any of the positions indicated by the broken lines and wherein $R_1$, $R_2$, $R_3$, $R_4$ and $R_5$ are as defined in Formula IV, until cyclization is substantially complete, and recovering said oxaphenanthrene. Special mention is made of an important embodiment of this process: the preparation of 6a,7,10,10a-tetrahydro-6,6,9-trimethyl-3-pentyl-trans-6H-dibenzo - [b,d]pyran-1-ol, a substituted oxaphenanthrene compound of Formula IV with marked central nervous system activity, from 1-methyl-4-(1'-hydroxy-1'-methylethyl)-5-(2,6-dihydroxy-4-n-pentylphenyl)-1 cyclohexane, a compound of Formula V.

The instant invention also contemplates a two-step process, which is in essence the process outlined above including the step of treating a 2-o-alkoxyphenylcyclohexanecarboxylic acid or ester of Formula VI:

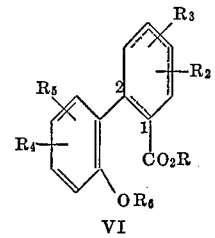

VI or a derivative thereof wherein the cyclohexane ring contains one olefinic bond in any of the positions indicated by the broken lines and wherein R, $R_2$, $R_3$, $R_4$ and $R_6$ are as defined hereinabove and $R_5$ is hydrogen, alkyl of from 1 to 12 carbon atoms or alkoxy of from 1 to 6 carbon atoms with at least four equimolar amounts of a Grignard reagent of the formula $R_1MgX$ wherein $R_1$ is as defined above and X is chlorine, bromine or iodine until formation of a 1-(1'-hydroxyalkyl-2-o-hydroxyphenylcyclohexane of Formula V is substantially complete. Special mention is made of an important embodiment of this step of the two-step process; this is treating 1-methyl-5-(2,6 - dimethoxy-4-pentylphenyl)-1-cyclohexene-4-carboxylic acid, a compound of Formula VI with methyl magnesium iodide to form 1-methyl-4-(1-hydroxy-1-methylethyl) - 5 - (2,6-di-hydroxy-4-n-pentylphenyl)-1-cyclohexene, a compound of Formula V.

Also contemplated by the instant invention is the novel class of intermediates defined by Formula V hereinabove or derivatives thereof wherein the cyclohexene ring contains one olefinic bond in any of the positions indicated by the broken lines and wherein $R_1$ is alkyl of from 1 to 6 carbon atoms;
$R_2$ and $R_3$ are hydrogen or alkyl of from 1 to 6 carbon atoms;
$R_4$ is hydrogen or alkyl of from 1 to 12 carbon atoms; and
$R_5$ is hydrogen or alkyl of from 1 to 12 carbon atoms or hydroxy.

Especially valuable is the species of Formula V, which is 1-methyl-4-(1 - hydroxy-1-methylethyl)-5-(2,6-dihydroxy-4-n-pentylphenyl)-1-cyclohexene. This is cyclized by the instant process to provide 6a,7,10,10a-tetrahydro-6,6,9-trimethyl-3-pentyl-trans-6H-dibenzo[b,d]pyran-1-ol.

When used herein and in the appended claims, the terms alkyl and alkoxy comprehend substituents containing up to six or twelve carbon atoms, as the case may be, for alkyl and up to six carbon atoms in the alkoxyl group. The carbon atoms may be joined in straight or branched chain arrangements. Illustrative of such groups ar methyl, ethyl, n-propyl, n-pentyl, 1,1-dimethylpentyl, 1,2-dimethylheptyl, decyl, dodecyl, methoxy, ethoxy, isopropoxy, n-pentoxy, n-hexyloxy, and the like. While no particular limitations are intended as to the nature and specific position of the substituents $R_2$ and $R_3$ in the cyclohexane ring, and $R_4$ and $R_5$ in the aromatic ring, and of the olefinic double bond if present, in the cyclohexane ring in compounds of Formulae IV–VI, especially valuble embodiments of this invention appear to reside in those processes and intermediates wherein, with reference to the numbers used in Formula I, $R_2$ is hydrogen, $R_3$ is methyl and fixed in the 9-position, $R_4$ is alkyl and is fixed in the 3-position; $R_5$ is hydroxyl in Formulae IV and V and alkoxy, especially methoxy, in Formula VI and is fixed in the 1-position and the olefinic bond, if present, is either between the 9- and 10-positions or, and preferably, the 8- and 9-positions.

The reaction conditions under which the 1-(1'-hydroxyalkyl)-2-o-hydroxyphenylcyclohexane (V) is cyclized to form the oxaphenanthrene (IV) are not particularly critical. Although water is to be eliminated, it is not necessary to heat the compound of Formula V. For example, cyclodehydration takes place at room temperature (about 23° C.) if the compound of Formula V is suspended in benzene and anhydrous p-toluenesulfonic acid added. The reaction can also be carried out in a relatively shorter time in benzene at reflux temperatures. At these higher temperatures acidic dehydrating catalysts, such as p-toluene sulfonic acid monohydrate or hydrogen bromide or obvious chemical equivalents thereof, cause cyclodehydration to occur with good efficiency. It is even possible to cyclodehydrate compounds of Formula V by heating them without solvent or catalyst at temperatures of up to about 200° C., but, of course, purity and yield will often be sacrificed. The compounds of Formula V can also be cyclodehydrated by distilling them in a vacuum, for example, at a temperature of about 200° C. and a pressure of up to about 10 mm. of mercury. The extent of the completeness of reaction is easily followed if the process is conducted under such conditions that the water of condensation is continuously removed and measured. When the water substantially ceases to be evolved the cyclization is deemed to be complete. If benzene is used as a solvent and the reaction is carried out under a so-called Dean-Stark trap, such an end point is readily observed. If, for example, about 1 gram of 1-methyl-4-(1-hydroxy-1-methylethyl)-5-(2,6 - dihydroxy-4-n-pentyl-phenyl)-1-cyclohexene is suspended in 25 ml. of benzene, 100 mg. of p-toluenesulfonic acid is added and the mixture is refluxed under a Dean-Stark trap for one hour, cyclization is substantially complete and a good yield of the desired product is obtained. The oxaphenanthrene products can be recovered from the reaction mixtures by a variety of chemical techniques. One method is to wash the reaction mixture first with dilute sodium bicarbonate solution and then with brine. Then the benzene solution is concentrated to leave a residue. This can be purified by first dissolving it in a mixture of hexane and ether then, if $R_5$ is hydroxy, extracting the solution with strong alkali, acidifying the extract, re-extracting the acidified suspension with ether and, finally, evaporating the ether to leave the oxaphenanthrene as a residue.

The reaction conditions under which the 2-o-alkoxyphenyl-cyclohexanecarboxylic acid or ester (VI) is converted with an alkylmagnesium halide to a 1-(1'-hydroxy-alkyl)-2-o-hydroxyphenyl-cyclohexane or derivative (V) are somewhat more critical. Here, for best yields, it is needed to heat the reaction mixture at temperatures of up to about 130° C. and to finish the reaction at higher temperatures, up to 165° C. or even higher, for example up to 200° C., depending on the Grignard reagent. The compound of Formula VI is conveniently suspended in dry diethyl ether and then added to a solution of at least 4 equimolar amounts of the appropriate Grignard reagent in ether. The mixture then should gradually be heated to about 130° C. to fully evaporate the solvent then the reaction is completed by raising the temperature to from about 165° C. to about 200° C. for about 30 minutes. The product is treated to make it suitable for cyclization to the oxaphenanthrene by cooling the mixture and cautiously decomposing any excess Grignard reagent with an ammonium chloride-ice-water mixture. Dilute aqueous acid is added, the mixture is extracted with ether, the ether is washed with brine, and with dilute potassium carbonate solution, then dried and the solvent is evaporated. The residue is sufficiently pure at this point to be used in the cyclization step.

The starting materials of Formula II used in the practice of this invention are either available commercially or can be prepared by those skilled in the art by means of many synthetic pathways, some of which are outlined as follows:

(1) Compounds of Formula IIa which are substituted 2-o-alkoxyphenylcyclohexanecarboxylic acids or 2-o-alkoxyphenyl-cyclohex-1-enecarboxylic acids can be prepared by treating an appropriately substituted pyrone VII with alkylating and hydrolyzing agents such as dimethylsulfate and sodium hydroxide:

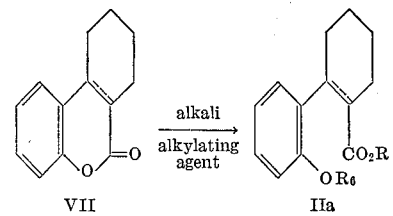

wherein R and $R_6$ are as defined above and the broken line indicates an optional double bond. The preparation of a number of illustrative compounds of Formula VII is fully exemplified in R. Adams, U.S. Pat. 2,419,935. Other compounds within the definition of Formula IIa are easily obtained by processes entirely analogous to those described in the Adams patent.

(2) Compounds of Formula IIb which are substituted 2 - o - alkoxyphenylcyclohex - 3 - ene carboxylic acids and esters can be prepared by a Diels-Alder condensation involving a suitably substituted 1-(o-alkoxyphenyl)-butadiene VIII and acrylic acid or ester:

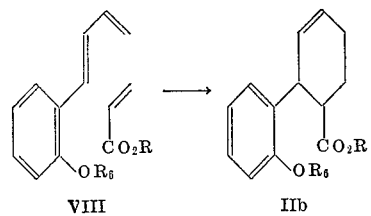

wherein R and $R_6$ are as defined hereinabove. Processes useful for the preparation of compounds of Formula VIII and their Diels-Adler condensation product are fully described in F. Korte, E. Dlugosch and U. Claussen, Annalen, 693, 165 (1966). Compounds within the definition of Formula IIb are easily obtained by processes entirely analogous to those described in the Korte et al. reference.

(3) Compounds of Formula IIc which are substituted 2-o-alkoxyphenylcyclohex - 5 - enecarboxylic acids and esters can be prepared by selective reduction of appropriately-substituted 2-o-alkoxyphenyl-benzoic acids IX with alkali metals, such as lithium, in liquid ammonia:

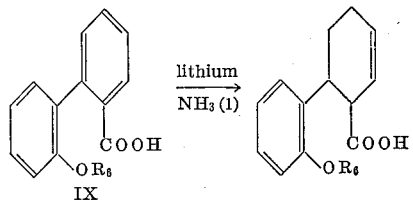

wherein $R_6$ is as defined hereinabove and, if required, converting the carboxyl group to an esterified carboxyl group. The preparation of a number of illustrative acids of Formula IX is fully described in H. G. Rule and E. Brotscher, J. Chem. Soc., 926 (1927). Other compounds within the definition of Formula IIc and IX are easily obtained by processes entirely analogous to those described in the references and outlined hereinabove.

(4) Compounds of Formula IId which are substituted 2-o-alkoxyphenylcyclohex-4-ene carboxylic acids or esters can be prepared by a Diels-Alder condensation involving a suitably-substituted cinnamic acid or ester (X) and a diene:

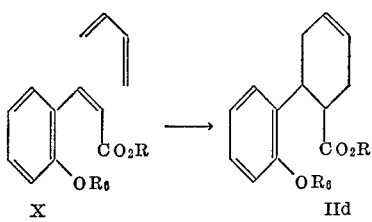

wherein R and $R_6$ are as hereinabove defined. Processes useful for the preparation of compounds of Formula IId and X are fully described in R. Adams and R. B. Carlin, J. Am. Chem. Soc., 65, 360 (1943). Compounds within the definition of Formula IId are easily obtained by processes entirely analogous to those described in the Adams et al. reference.

Compounds of Formula IV possess valuable pharmaceutical properties. In particular these compounds are widely recognized to possess central nervous system activity. In addition, many of the compounds of Formula IV are useful as intermediates in the preparation of oxaphenanthrenes with central nervous system activity. Compounds prepared by the instant processes thus are useful as euphoriants and in the treatment and reversal of thalmic dysfunction syndromes, which cause neurotic depressions. They are useful in the treatment of depressive patients and drug addicts.

When used for the purposes illustrated above, it may be desirable according to conventional pharmaceutical practice to combine the specific compound selected into compositions suitable for enteral or parenteral administration by formulation with a pharmaceutically acceptable organic or inorganic carrier. The composition may be prepared in solid form, such as tablets or in liquid form such as a solution, suspension or emulsion. Suitable liquid carriers include water, gelatin, lactose, starch, talc, vegetable oils, alcohols, polyalcohols, gums, syrups, and the like. The pharmaceutical composition in addition to the active principle and the carrier may include auxiliary materials such as coloring, stabilizing, wetting or emulsifying agents. It is, of course, to be understood that the carrier as well as any other materials present with the active principle be inert with respect thereto.

The dosage of the present therapeutic agents will vary with the form of administration and the particular compound selected. Furthermore, the dosage will vary with the particular subject being treated. Generally treatment is initiated with small dosages, substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 15 mg. to about 90 mg. per day for the adult human although, as mentioned, variations will occur.

As has been mentioned hereinbefore, this invention has as one of its objects the provision of a means to obtain optically active oxaphenanthrenes by a stereoselective process comprising cyclizing a resolved precursor. Now for the first time, for example, total syntheses of the correct enantiomorph of the naturally occurring tetrahydrocannabinol and its optical enantiomorph have been achieved.

This object is obtained by practice of an embodiment which is, in essence: a process for the preparation of an enantiomorphic oxaphenanthrene of Formula A or B:

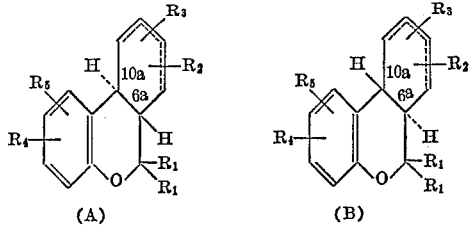

or a derivative thereof wherein the cyclohexane ring contains one olefinic bond in any of the positions indicated by the broken lines and wherein in said oxaphenanthrene or derivative $R_1$ is alkyl of from 1 to 6 carbon atoms;

$R_2$ and $R_3$ are hydrogen or alkyl of from 1 to 6 carbon atoms;

$R_4$ is hydrogen or alkyl of from 1 to 12 carbon atoms; and $R_5$ is hydrogen, alkyl of from 1 to 12 carbon atoms or hydroxy;

which comprises treating under dehydrating conditions the corresponding enantiomorphic 1-(1'-hydroxyalkyl)-2-o-hydroxyphenylcyclohexane of Formula $A_1$ or $B_1$:

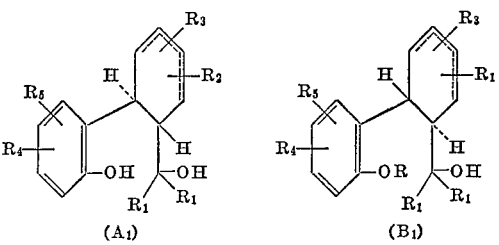

or a derivative thereof wherein the cyclohexane ring contains one olefinic bond in any of the positions indicated by the broken lines and wherein $R_1$, $R_2$, $R_3$, $R_4$ and $R_5$ are as defined above, until cyclization is substantially complete and recovering siad enantiomorphic oxaphenanthrene substantially free of its optical antipode. Special mention is made of several valuable embodiments of this process: these are, respectively, a process wherein (—)-6a,7,10,10a-tetrahydro-6,6,9 - trimethyl - 3-n-pentyl-trans-6H-dibenzo[b,d]-pyran-1-ol is prepared by cyclizing (—)-1-methyl-4-(1-hydroxy-1-methylethyl)-5-(2,6 - dihydroxy-4-n-pentylphenyl)-1-cyclohexene, and a process wherein (+)-6a,7,10,10a-tetrahydro - 6,6,9 - trimethyl-3-n-pentyl-trans-6H-dibenzo[b,d]-pyran-1-ol is prepared by cyclizing (+)-1-methyl-4-(1-hydroxy-1-methylethyl) - 5-(2,6-dihydroxy-4-n-pentylphenyl)-1-cyclohexene.

Specifically contemplated by this invention are compounds of Formulae $A_1$ and $B_1$. These useful intermediates are, respectively, enantiomorphic forms of the compounds of Formula V hereinabove, which have a saturated linkage between carbon atoms 1 and 2; substantially free of their optical antipodes. Especially valuable compounds of Formulae $A_1$ and $B_1$, respectively, are (—)-1-methyl-4-(1 - hydroxy - 1-methylethyl)-5-(2,6-dihydroxy-4-n-pentylphenyl)-1 - cyclohexene and (+)-1-methyl-4-(1-hydroxy - 1 - methylethyl)-5-(2,6-dihydroxy-n-pentylphenyl)-1-cyclohexene.

Starting compounds of Formulae $A_1$ and $B_1$ can be obtained by splitting the racemic mixture of compounds of Formula V prepared by methods described in detail herein or in the references mentioned hereinabove. It is preferred, however, to obtain them by treating the corresponding optically active, enantiomorphic 2-o-alkoxyphenylcyclohexene-carboxylic acids of Formula VI herein above wherein the 1,2-position is saturated, with a Grignard reagent as described above. These enantiomorphic carboxylic acids are obtained by splitting the racemates obtained by the synthetic pathways outlined herein, preferably in a chemical resolution. Thus the recemic carboxylic acid is combined with an optically active base, such as for example, cinchonine, cinchonidine, quinine, quinidine, strychnine, morphine, brucine, α-(1-naphthyl)ethylamine, and the like, and two salts are obtained which are no longer antipodes. The two salts produced posses different properties and different solubilities, and can be separated by fractional crystallization. When the salts have been completely separated by repeated crystallization, the base is split off by adding a stronger base, such as sodium hydroxide, or a mineral acid, such as hydrochloric acid. A preferred method, employing, respectively, d-α-(1-naphthyl)ethylamine and l-α-(1-naphthyl)-ethylamine as the optically active bases will be exemplified in detail hereinafter.

As has been mentioned above, total syntheses have recently been announced of dl-Δ⁸ and Δ⁹-tetrahydrocannabinol which, in the corresponding enantiomorphic forms, occur as psychotomimetically active constituents of hashish. The term "tetrahydrocannabinol" is used in the sense proposed by K. E. Fahrenholtz, M. Lurie and R. W. Kierstad, J. Am. Chem. Soc., 88, 367 (1966), and the nomenclature is that of Chemical Abstracts. One of the embodiments of this invention is the synthesis of (—)-Δ⁸-tetrahydrocannabinol XIV which represents the first total synthesis of a biologically active, asymmetric constituent of hashish in the correct enantiomorphic modification:

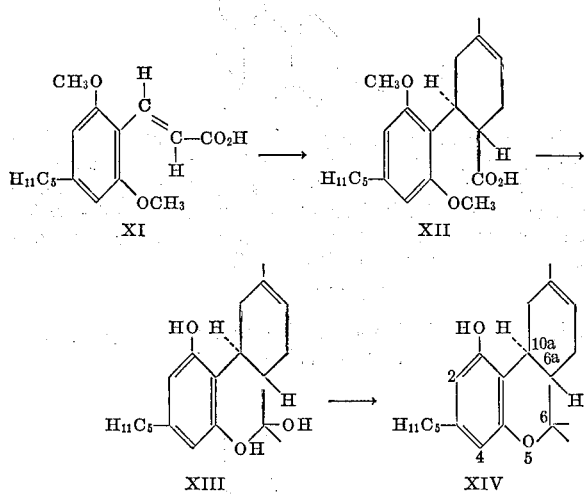

The synthesis depended initially on the observation that since the cinnamic acid (XI), from its method of preparation by the Knoevenagel reaction of malonic acid with the corresponding aldehyde, should have the anti-configuration, it may be predicted, from the rule governing the retention of configuration of the dienophile constitutents in the Diels-Alder reaction [e.g., J. G. Martin and R. K. Hill, Chem. Rev., 61, 537 (1961)], that the racemic adduct of XI with isoprene should have the trans-configuration XII analogous to that found in Δ⁸- and Δ⁹-tetrahydrocannabinol. The anti-configuration of XI is confirmed by PMR spectrum, in which the olefinic protons display a coupling constant, J, 16 cps., in good agreement with the value 17 cps. observed for anti-styrenoid protons, and quite distinct from the value 10 cps. found for corresponding syn-protons. The racemic adduct XII, from XI and isoprene, is resolved by fractional crystallization of its diasteroisomeric (+)-1 - 1' - naphthylethylamine (also known as d-α-(1-naphthyl)ethylamine) salts from hexane. Fusion of the resulting (—)-XII with methylmagnesium iodide at 165° C. demethylates the dimethoxybenzene ring and converts the carboxyl to a 2-hydroxypropyl group, affording the triol XIII. The latter on distillation (bath temp. 200°, .01 mm.) gives a gum which is separated by preparative gas-liquid chromatography into pure Δ⁸-tetrahydrocannabinol XIV, obtained as a gum displaying PMR signals in excellent agreement with those cited for the authentic racemate.

The residual salts from the foregoing resolution are decomposed with 3 N hydrochloric acid and the resulting acid is resolved by fractional crystallization of its (—)-1-1'-naphthylethylamine salts from hexane to give (+)-XII, which is converted as for (—)-XII to (+)-XIV. These procedures are exemplified in detail hereinafter.

The following examples are illustrative of the processes and products of this invention. They are not to be construed to limit the scope of the invention in any manner whatsoever.

EXAMPLE I 6a,7,10,10a-tetrahydro-6,6,9-trimethyl-3-n-pentyl-trans-6H-dibenzo[b,d]pyran-1-ol

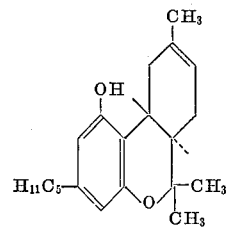

(a) 1-methyl-4-(1-hydroxyl-1-methyl ethyl)-5-(2,6 - dihydroxy-4-n-pentylphenyl)-1-cyclohexene.—A solution of 1.0 g. of 1-methyl-5-(2,6-dimethoxy-4-n-pentylphenyl)-1-cyclohexene-4-carboxylic acid in 5 ml. of dry diethyl ether is added to 10 ml. of a 3 M solution of methyl magnesium iodide in ether. The mixture is heated gradually to 130° C. to evaporate the solvent and the viscous oily residue is kept at a bath temperature of 165° for 30 min. The mixture then is cooled in a Dry Ice-actone bath and the excess Grignard reagent is cautiously decomposed with ammonium chloride-ice-water mixture. Dilute hydrochloric acid is added and the acidic mixture is extracted with ether. After washing with brine, dilute potassium carbonate solution and brine, the ether is dried over sodium sulfate and evaporated to provide a viscous oil whose infrared spectrum shows strong hydroxyl absorption corresponding to that of the expected product.

(b) 6a,7,10,10a-tetrahydro-6,6,9-trimethyl - 3 - pentyl-trans-6H-dibenzo[b,d]pyran-1-ol.—The material of step (a) in 25 ml. of benzene is refluxed with 100 mg. of p-toluene sulfonic acid for 1 hour with continuous removal of water by a Dean-Stark trap. After washing with sodium bicarbonate solution and brine, the benzene solution is evaporated to a gummy residue which is dissolved in 15 ml. of hexane-ether (1:1) and is extracted with two 5 ml. portions of Claisen's alkali. After acidifying the alkaline solution, it is extracted with ether. The ether extract is washed with brine and dried over sodium sulfate. Evaporation of the ether affords the desired product as a viscous oil which has $\lambda_{max}^{film}$ 2.95, 6.17, 6.35 and 7.04μ

The NMR spectrum conforms to the expected values.

EXAMPLE II 6a,7,8,10a-tetrahydro - 6,6,9 - trimethyl-3-n-pentyl-6H-dibenzo[b,d]pyran-1-ol

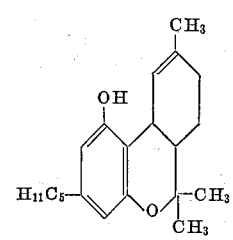

The procedure of Example I is used to convert 1-methyl 5-(2,6-dimethoxy-4-n-pentylphenyl) - 6 - cyclohexene-4- carboxylic acid to 1-methyl-4-(1-hydroxy-1-methylethyl)-5 - (2,6-dihydroxy-4-n-pentylphenyl)-6-cyclohexene and this, in turn, to the named product.

EXAMPLE III 7,8,9,10 - tetrahydro - 6,6,9 - trimethyl - 3 - n - butyl-6H-dibenzo[b,d]pyran-1-ol

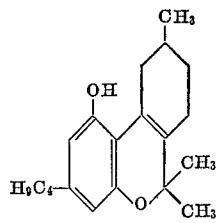

The procedure of Example I is used to convert 1-methyl - 5 - (2,6 - dimethoxy-4-n-butylphenyl)-4-cyclohexene - 4 - carboxylic acid to 1-methyl-4-(1-hydroxy-1-methylethyl) - 5 - (2,6 - dihydroxy-4-n-butylphenyl)-4-cyclohexene and this, in turn, to the named product, boiling point about 145–150° C. at 0.08 mm.

EXAMPLE IV 7,8,9,10 - tetrahydro - 6,6,9 - trimethyl - 3 - n - hexyl-6H-dibenzo[b,d]pyran-1-ol

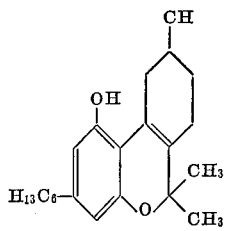

The procedure of Example I is used to convert 1-methyl-5 - (2,6 - dimethoxy - 4 - n - hexylphenyl)-4-cyclohexene-4-carboxylic acid to 1-methyl-4-(1-hydroxy - 1 - methylethyl)-5-(2,6-dihydroxy - 4 - n - hexylphenyl)-4-cyclohexene and this, in turn, to the named product, boiling point about 183–186° C. at 0.4 mm.

As is shown in the Merck Index, seventh edition, this compound is useful therapeutically as a euphoriant in thalmic dysfunction syndrome.

EXAMPLE V 7,8,9,10 - tetrahydro - 6,6 - diethyl-9-methyl-3-n-pentyl-6H-dibenzo[b,d]pyran-1-ol

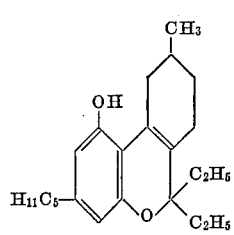

The procedure of Example I is used with ethyl magnesium iodide to convert 1-methyl-5-(2,6-dimethyoxy-4-n-pentyl-phenyl) - 4 - cyclohexene-4-carboxylic acid to 1-methyl-4-(1-hydroxy-1-ethylpropyl) - 5 - (2,6-dihydroxy-4-n-pentylphenyl)-4-cyclohexene and this, in turn, to the named product, boiling point about 185–195° C. at 0.02 mm.

EXAMPLE VI 7,8,9,10 - tetrahydro - 6,6 - di-n-propyl - 9 - methyl-3-n-pentyl-6H-dibenzo[b,d]pyran-1-ol

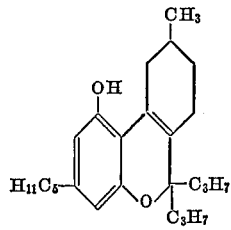

The procedure of Example I is used with n-propyl magnesium bromide to convert 1-methyl-5-(2,6-dimethoxy-4-n-pentylphenyl) - 4 - cyclohexene - 4 - carboxylic acid to 1 - methyl - 4 - (1 - hydroxy - 1 - n-propyl-n-butyl)-4-cyclohexene and this, in turn, to the named product, boiling point about 200–204° C. at 2 mm.

EXAMPLE VII 7,8,9,10 - tetrahydro - 6,6,9 - trimethyl-3-n-heptyl-6H-dibenzo[b,d]pyran-1-ol

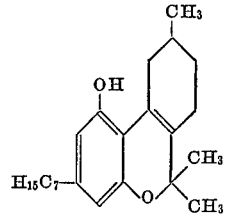

The procedure of Example I is used to convert 1-methyl-5 - (2,6 - dimethoxy - 4 - n - heptylphenyl)-4-cyclohexene-4-carboxylic acid to 1-methyl - 4 - (1-hydroxy-1-methylethyl) - 5 - (2,6-dihydroxy-4-n-heptylphenyl) - 4 - cyclohexene and this, in turn, to the corresponding named product, boiling point about 225–228° C. at 0.05 mm.

EXAMPLE VIII 7,8,9,10 - tetrahydro - 6,6,10 - trimethyl-3-n-pentyl-6H-dibenzo[b,d]pyran-1-ol

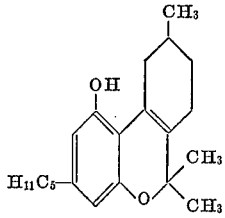

The procedure of Example I is used to convert 6-methyl-5-(2,6 - dimethoxy - 4 - n - pentylphenyl)-4-cyclohexene - 4 - carboxylic acid to 6 - methyl - 4 - (1-hydroxy-1-methylethyl) - 5 - (2,6-dihydroxy-4-n-pentyl-phenyl)-4-cyclohexene and this, in turn, to the corresponding named product, boiling point about 181–185° C. at 0.5–1.0 mm.

EXAMPLE IX 6a,7,8,9,10,10a-hexahydro-6,6,10-trimethyl-3-n-pentyl-6H-dibenzo[b,d]pyran-1-ol

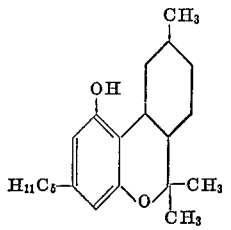

The procedure of Example I is used to convert 1-methyl - 5 - (2,6 - dimethoxy - 4 - n - pentylphenyl)cyclohexane - 4 - carboxylic acid to 1 - methyl - 4 - (1 - hy-

EXAMPLE X 7,8,9,10-tetrahydro-6,6,9-trimethyl-3-(1-methylhexyl)-
6H-dibenzo[b,d]pyran-1-ol

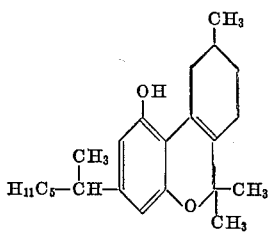

The procedure of Example I is used to convert 1-methyl - 5 - [2,6 - dimethoxy - 4 - (1 - methylhexyl) phenyl] - 4 - cyclohexene - 4 - carboxylic acid to 1 - methyl - 4 - (1 - hydroxy - 1 - methylethyl) - 5 - [2,6 - dihydroxy - 4 - (1 - methylhexyl)phenyl] - 4 - cyclohexene and this, in turn, to the named product, boiling point 208-213° C. at 2 mm.

EXAMPLE XI 7,8,9,10-tetrahydro-6,6,9-trimethyl-3-(1-methylpentyl)-
6H-dibenzo[b,d]pyran-1-ol

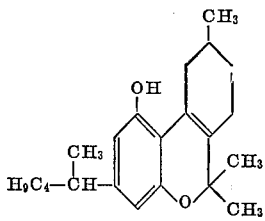

The procedure of Example I is used to convert 1-methyl - 5 - [2,6 - dimethoxy - 4 - (1 methylpentyl) phenyl] - 4 - cyclohexene - 4 - carboxylic acid to 1-methyl-4 - (1 - hydroxy - 1 - methylethyl) - 5 - [2,6 - dihydroxy-4 - (1 - methylpentyl)phenyl] - 4 - cyclohexene and this, in turn, to the named product, boiling point 173-181° C. at less than 1 mm.

EXAMPLE XII 7,8,9,10-tetrahydro-6,6,9-trimethyl-3-(1-n-propylpentyl)-
6H-dibenzo[b,d]pyran-1-ol

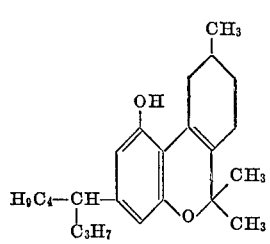

The procedure of Example I is used to convert 1-methyl - 5 - [2,6 - dimethoxy - 4 - (1 - n - propylpentyl) phenyl] - 4 - cyclohexene - 4 - carboxylic acid to 1-methyl - 4 - (1 - hydroxy - 1 - methylethyl) - 5 - [2,6 - dihydroxy - 4 - (1 - n - propylpentyl)phenyl] - 4 - cyclohexene and this, in turn, to the named product, boiling point 211-214° C. at 2 mm.

EXAMPLE XIII 7,8,9,10-tetrahydro-6,6,9-trimethyl-3-(1-methylbutyl)-
6H-dibenzo[b,d]pyran-1-ol

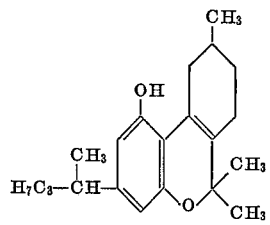

The procedure of Example I is used to convert 1-methyl - 5 - [2,6 - dimethoxy - 4 - (1 - methylbutyl) phenyl] - 4 - cyclohexene - 4 - carboxylic acid to 1 - methyl - 4 - (1 - hydroxy - 1 - methylethyl) - 5 - [2,6 - dihydroxy - 4 - (1 - methylbutyl)phenyl] - 4 - cyclohexene and this, in turn, to the named product, boiling point 201-204.5° at 3 mm.

EXAMPLE XIV 7,8,9,10-tetrahydro-6,6,9-trimethyl-3-(1-ethylbutyl)-
6H-dibenzo[b,d]pyran-1-ol

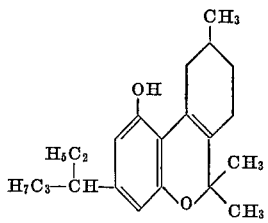

The procedure of Example I is used to convert 1-methyl - 5 - [2,6 - dimethoxy - 4 - (1 - ethylbutyl)phenyl] - 4 - cyclohexene - 4 - carboxylic acid to 1 - methyl - 4 - (1 - hydroxy - 1 - methylethyl) - 5 - [2,6 - dihydroxy-4 - (1 - ethylbutyl)phenyl] - 4 - cyclohexene and this, in turn, to the named product, boiling point 211-213° C. at 3.5 mm.

EXAMPLE XV 7,8,9,10-tetrahydro-6,6,9-trimethyl-3-(1-methylheptyl)-
6H-dibenzo[b,d]pyran-1-ol

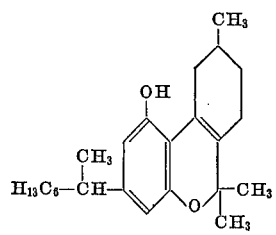

The procedure of Example I is used to convert 1-methyl - 5 - [2,6 - dimethoxy - 4 - (1 - methylheptyl) phenyl] - 4 - cyclohexene - 4 - carboxylic acid to 1-methyl-4 - (1 - hydroxy - 1 - methylethyl) - 5 - [2,6 - dihydroxy-4 - (1 - methylheptyl)phenyl] - 4 - cyclohexene and this, in turn, to the named product, boiling point 217-222° C. at 2.5 mm.

EXAMPLE XVI 7,8,9,10-tetrahydro-6,6,9-trimethyl-3-(1,1-dimethylbutyl)-6H-dibenzo[b,d]pyran-1-ol

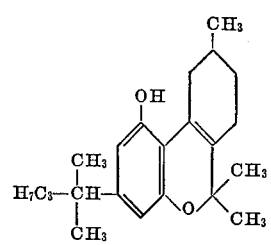

The procedure of Example I is used to convert 1-methyl - 5 - [2,6 - dimethoxy - 4 - 1,1 - dimethylbutyl)phenyl] - 4 - cyclohexene - 4 - carboxylic acid to 1-methyl-4 - (1 - hydroxy - 1 - methylethyl) - 5 - [2,6 - dihydroxy-4 - (1,1 - dimethylheptyl)phenyl]- 4 - cyclohexene and this, in turn, to the named product, boiling point 158° C. at 0.02 mm.

EXAMPLE XVII 7,8,9,10-tetrahydro-6,6,9-trimethyl-3-(1,1-dimethylheptyl)-6H-dibenzo[b,d]pyran-1-ol

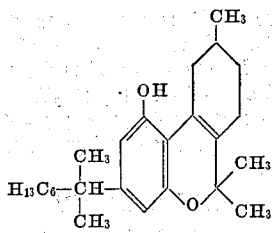

The procedure of Example I is used to convert 1-methyl - 5 - [2,6 - dimethoxy-4-(1,1-dimethylheptyl)-phenyl] - 4 - cyclohexene - 4 - carboxylic acid to 1-methyl - 4-(1-hydroxy-1-methylethyl)-5-[2,6-dihydroxy-4-(1,1-dimethylheptyl)phenyl]-4-cyclohexene and this, in turn, to the named product, boiling point 174–176° C. at 0.04 mm.

EXAMPLE XVIII 7,8,9,10-tetrahydro-6,6,9-trimethyl-3-(1,2-dimethylheptyl)-6H-dibenzo[b,d]pyran-1-ol

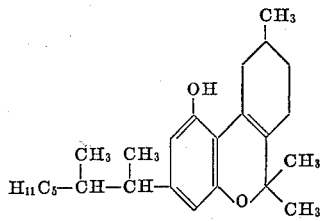

The procedure of Example I is used to convert 1-methyl - 5 - [2,6 - dimethoxy-4-(1,2-dimethylheptyl)-phenyl] - 4 - cyclohexene-4-carboxylic acid to 1-methyl-4 - (1 - hydroxy - 1-methylethyl)-5-[2,6-dihydroxy-4-(1,2-dimethylheptyl)phenyl]-4-cyclohexene and this, in turn, to the named product, boiling point 170–173° C. at 0.04 mm.

EXAMPLE XIX 6a,7,10,10a-tetrahydro-6,6,8,9-tetramethyl-3-n-pentyl-6H-dibenzo[b,d]pyran-1-ol

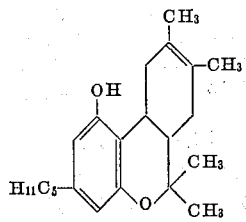

The procedure of Example I is used to convert 1,2-dimethyl - 5 - (2,6-dimethoxy-4-n-pentylphenyl)-1-cyclohexene-4-carboxylic acid to 1,2-dimethyl-4-(1-hydroxyl-1 - methylethyl) - 5-(2,6-dihydroxy-4-n-pentylphenyl)-1-cyclohexene and this, in turn, to the named product.

EXAMPLE XX

The procedure of Example I, step (a) is repeated with appropriately substituted 2 - o-alkoxyphenylcyclohexane carboxylic acids and esters and Grignard reagents and the following 1 - (1'-hydroxyalkyl)-2-o-hydroxyphenylcyclohexenes or derivatives are obtained:

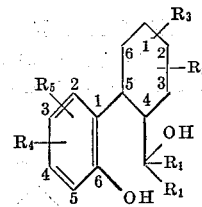

| R₁ | R₂ | R₃ | R₄ | R₅ | Olefinic unsaturation |
|---|---|---|---|---|---|
| CH₃ | H | H | 4-n-C₅H₂₁ | H | Yes; C₁-C₂. |
| CH₃ | H | 1-CH₃ | 4-CH₃ | 2-CH₃ | Yes; C₁-C₂. |
| CH₃ | H | 1-CH₃ | 4-n-C₅H₁₁ | 2-OH | Yes; C₂-C₃. |
| CH₃ | H | H | H | H | No. |
| CH₃ | H | H | H | 2-OH | No. |

The procedure of Example I, step (b) is used to cyclize the above compounds and the following oxaphenanthrenes are obtained:

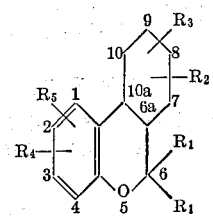

| R₁ | R₂ | R₃ | R₄ | R₅ | Olefinic unsaturation |
|---|---|---|---|---|---|
| CH₃ | H | H | 3-n-C₅H₁₂ | H | Yes; C₈-C₉. |
| CH₃ | H | 9-CH₃ | 1-CH₃ | 1-CH₃ | Yes; C₈-C₉. |
| CH₃ | H | 9-CH₃ | 3-n-C₅H₁₁ | 1-OH | Yes; C₇-C₈. |
| CH₃ | H | H | H | H | No. |
| CH₃ | H | H | H | 1-OH | No. |

EXAMPLE XXI (—)-6a,7,10,10a-tetrahydro-6,6,9-trimethyl-3-n-pentyl-trans-6H-dibenzo[b,d]pyran-1-ol (a) (—)-1-methyl-4-(1 - hydroxy - 1 - methyl ethyl)-5-(2,6 - dihydroxy - 4 - n-pentylphenyl)-1-cyclohexene.—A mixture of 34.0 g. of (±)-1-methyl-5-(2,6-dimethoxy-4-n-pentylphenyl)-1-cyclohexene-4-carboxylic acid and 21.6 g. of d-α-(1-naphthyl)ethylamine in 720 ml. of hexane is allowed to stand at 0° for 2 hours. The reaciton mixture is centrifuged at 6,000 r.p.m. at 0° for 20 min. and the precipitate collected by filtration. The residue is recrystallized four times from hexane and then shaken with a mixture of ether and 2 N hydrochloric acid. The ethereal solution is washed with water, dried and evaporated to obtain (—)-1-methyl-5-(2,6 - dimethoxy-4-n-pentylphenyl)-1-cyclohexene-4-carboxylic acid (2.8 g.) M.P. 137.5–138.5°, [α]ᴅ²⁴—63° (C, 1.019 CHCl₃). 1.0 g. of this acid in 5 ml. of dry ether is added to 10 ml. of a 3 M solution of methyl magnesium iodide in ether. The mixture is heated gradually to 130° C. to evaporate the solvent and the viscous oily residue is kept at a bath temperature of 165° for 4.5 hr. The mixture then is cooled in a Dry Ice-acetone bath and the excess Grignard reagent is cautiously decomposed with ammonium chloride-ice-water mixture and extracted with ether. After washing with brine, dilute potassium carbonate solution and brine, the ether is dried over sodium sulfate and evaporated to provide a viscous oil whose infrared spectrum shows strong hydroxyl absorption corresponding to that of the expected product.

(b) (—)-6a,7,10,10a-tetrahydro - 6,6,9 - trimethyl-3-n-pentyl-trans-6H-dibenzo [b,d]pyran-1-ol.—The material of step (a) is distilled at 200° (bath temperature) at .01 mm. Hg to afford the product as a viscous oil which has $$\lambda^{film}_{max.}\ 2.95,\ 6.17,\ 6.35,\ 7.04\mu$$

$[\alpha]_D^{24}$ −173° (c, 1.202 EtOH). The material is purified by gas-liquid chromatography to give the pure compound $[\alpha]_D^{25}$ −256°.

EXAMPLE XXII (+)-6a,7,10,10a-tetrahydro-6,6,9-trimethyl-3-n-pentyl-trans-6H-dibenzo[b,d]pyran-1-ol (a) (+)-1-methyl-4-(1-hydroxy - 1 - methyl ethyl)-5-(2,6 - dihydroxy - 4 - n-pentylphenyl)-1-cyclohexene.—A mixture of 34.0 g. of (±)-1-methyl-5-(2,6-dimethoxy-4-n-pentylphenyl)-1-cyclohexene-4-carboxylic acid and 21.6 g. of l-α-(1-naphthyl)-ethylamine in 500 ml. of hexane is allowed to stand at 0° for 2 hr. The reaction mixture is centrifuged at 6,000 r.p.m. at 0° for 20 min. and the precipitate collected by filtration. The residue is recrystallized four times from hexane and then shaken with a mixture of ether and 2 N hydrochloric acid. The ethereal solution is washed with water, dried and evaporated to obtain (+)-1-methyl-5-(2,5-dimethoxy-4-n-pentylphenyl)-1-cyclohexene-4-carboxylic acid M.P. 137.5–138.5°, $[\alpha]_D^{24}$ +63° (c, 1.019 CHCl$_3$). 1.0 g. of this acid in 5 ml. of dry ether is added to 10 ml. of a 3 M solution of methyl magnesium iodide in ether. The mixture is heated gradually to 130° C. to evaporate the solvent and the viscous oily residue is kept at a bath temperature of 165° for 4.5 hr. The mixture then is cooled in a Dry Ice-acetone bath and the excess Grignard reagent is cautiously decomposed with ammonium chloride-ice-water mixture. Dilute hydrochloric acid is added and the acidic mixture is extracted with ether. After washing with brine, dilute potassium carbonate solution and brine, the ether is dried over sodium sulfate and evaporated to provide a viscous oil whose infrared spectrum shows strong hydroxyl absorption corresponding to that of the expected product.

(b) (+) - 6a,7,10,10a - tetrahydro-6,6,9-trimethyl-3-n-pentyl-trans - 6H - dibenzo[b,d]pyran-1-ol.—The material of step (a) is distilled at 200° (bath temperature) at .01 mm. Hg to afford the product as a viscous oil which has $$\lambda^{film}_{max.}\ 2.95,\ 6.17,\ 6.35,\ 7.04\mu$$

$[\alpha]_D^{24}$ +170° (c, 1.202 EtOH). The material is purified by gas-liquid chromatography to give the pure compound $[\alpha]_D^{25}$ +250°.

What is claimed is:
1. A 1-(1′-hydroxyalkyl)-2-o-hydroxyphenylcyclohexane of the formula

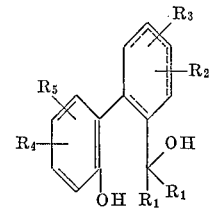

wherein the cyclohexane ring contains one olefinic bond in any of the positions indicated by the broken lines and wherein $R_1$ is alkyl of from 1 to 6 carbon atoms;
$R_2$ is hydrogen;
$R_3$ is hydrogen or 1-methyl;
$R_4$ is hydrogen, 4-methyl or 4-n-pentyl; and
$R_5$ is hydrogen, 2-methyl or 2-hydroxy.

2. 1-methyl-4-(1-hydroxy - 1 - methylethyl)-5-(2,6-dihydroxy-4-n-pentylphenyl)-1-cyclohexene.

3. An enanthiomorph of a compound as defined in claim 1, which has a saturated linkage between carbon atoms 1 and 2, selected from the class consisting of compounds having dextro-rotatory properties and compounds having levorotatory properties.

4. Enantiomorphic (−)-1 - methyl - 4 - (1 - hydroxy-1-methylethyl) - 5 - (2,6-dihydroxy-4-n-pentylphenyl)-1-cyclohexene.

5. Enantiomorphic (+)-1 - methyl - 4 - (1-hydroxy-1-methylethyl) - 5 - (2,6-dihydroxy-4-n-pentylphenyl)-1-cyclohexene.

References Cited

Burwell, "Chem. Reviews," vol. 54, No. 4, pp. 668–670, 707–711, August 1954.

Noller, "Chemistry of Organic Compounds," 3rd edition, p. 198.

Petrzilka et al., Synthesis and Chirality of (−)-Cannabadiol, Helvetica Chimica Acta, vol. 50, pp. 719–723 (1967).

Mechoulam et al., A Steriospecific Synthesis of (−)-Δ′- and (−) Δ′(6)-Tetrahydrocannabinols, Jour. of Am. Chem. Soc., 189: 171 Aug. 16, 1967.

Taylor et al., Synthesis of dl-Δ6-3,4 trans-tetrahydrocannabanol, Jour. of Am. Chem. Soc., 188: 211 Jan. 20, 1966, pp. 367–369.

BERNARD HELFIN, Primary Examiner

N. P. MORGENSTERN, Assistant Examiner

U.S. Cl. X.R.

260—345.9, 345.3, 999